Figure 1:
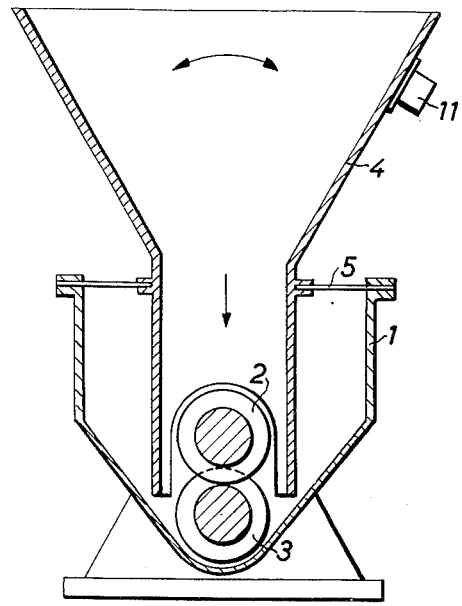

Nov. 10, 1953   R. ERDMENGER ET AL   2,658,604
WORM FEEDER

Filed Feb. 21, 1951   3 Sheets-Sheet 1

INVENTORS
RUDOLF ERDMENGER, PETER GASSEN
BY Connolly & Hutz
ATTORNEYS

Nov. 10, 1953 — R. ERDMENGER ET AL — 2,658,604
WORM FEEDER
Filed Feb. 21, 1951 — 3 Sheets-Sheet 2

INVENTORS
RUDOLF ERDMENGER, PETER GASSEN
BY Connolly & Hutz
ATTORNEYS

Nov. 10, 1953     R. ERDMENGER ET AL     2,658,604
WORM FEEDER

Filed Feb. 21, 1951     3 Sheets—Sheet 3

INVENTORS
RUDOLF ERDMENGER, PETER GASSEN
BY Connolly & Hutz
ATTORNEYS

Patented Nov. 10, 1953

2,658,604

UNITED STATES PATENT OFFICE 2,658,604

WORM FEEDER

Rudolf Erdmenger, Bergisch-Gladbach, and Peter Gassen, Koln-Buchforst, Germany, assignors to Farbenfabriken Bayer, Leverkusen, Germany Application February 21, 1951, Serial No. 212,018

Claims priority, application Germany February 28, 1950

4 Claims. (Cl. 198—64)

The present invention relates to a worm feeder for dosing adhesive or sticky material difficultly to convey, for instance, wet, pulverized substances, wet salts, pasty goods and the like.

The hitherto known worm feeders consisting of rotary feedscrews fitting closely an appropriate casing, said feedscrews taking out the material from a charging hopper provided at one end of the casing and discharging the material through a discharge tube provided at the other end of the casing, are not suitable for accurately dosing the above-said materials since these materials stick to the grooves of the worm thus rendering the delivery of an accurately dosed quantity through the discharge tube of the casing impossible. The accuracy of dosing can also not be improved by the additional arrangement of shaking apparatus on the charging hopper.

The drawbacks associated with the above-described worm feeder are eliminated according to the present invention by a device consisting of a casing provided at one end with a charging hopper for the material and a discharge tube provided at the other end. Feedscrews gripping one into the other are rotatably supported in the casing and closely fit the casing. The surfaces of the flanks of the helical threading of said feedscrews form, when cut at any places vertically to the worm shaft, circumferences, the radii of said circumferences corresponding to the distance of the axes of two feedscrews gripping one into the other, said circumferences touching the worm shaft. When operating with such feedscrews the surfaces and edges of the worms are scraped off automatically at the contact places of the worm groove with the helical threading of the counter worm so that clogging of the grooves is safely avoided by the self-clearing action of the screws and the discharge of a uniform quantity through the discharge tube of the casing is secured even when feeding wet adhesive material. Two or more single or multiple threaded feedscrews gripping one into the other may be arranged in the casing. Advancing of the material through the charging hopper to the feedscrews is further accelerated by a shaking apparatus arranged at the charging hopper, said shaking apparatus effecting vibration preferably also in the immediate vicinity of the feedscrews. If viscous or plastic materials are to be conveyed a worm feeder may be employed as conveyer the worms of which revolving in opposite directions. However, if finely or coarsely pulverized materials, either in the dry or wet state, which would cause jamming when operating with worms working in opposite direction, are to be conveyed, a worm system is advantageously used as feedscrews the worms of which revolving in the same direction. In both cases the complete scraping off of the material from the worms helps to uniformly feed the material.

According to a special embodiment of the invention the desired reaction or mixing process is initiated or completed already in the worm feeder, for instance, by feeding, at various places, one or more liquid or gaseous other components directly into the worm grooves.

A further improvement of feeding the material may be achieved by the arrangement of conveyer worms at the outlet junction of the charging hopper. These conveyer worms may be V-shaped. The surfaces and edges of these worms completely scrape off each other and the wall of the casing.

Figure 2:
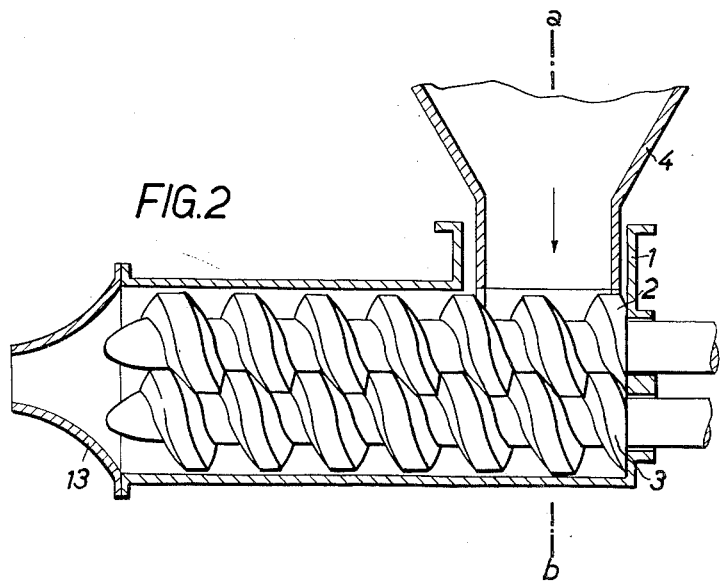
Figure 3:
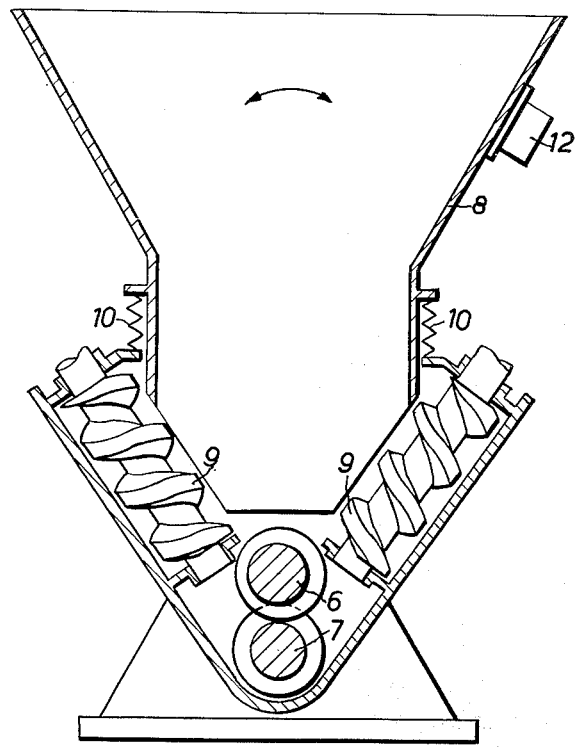
Figure 4:
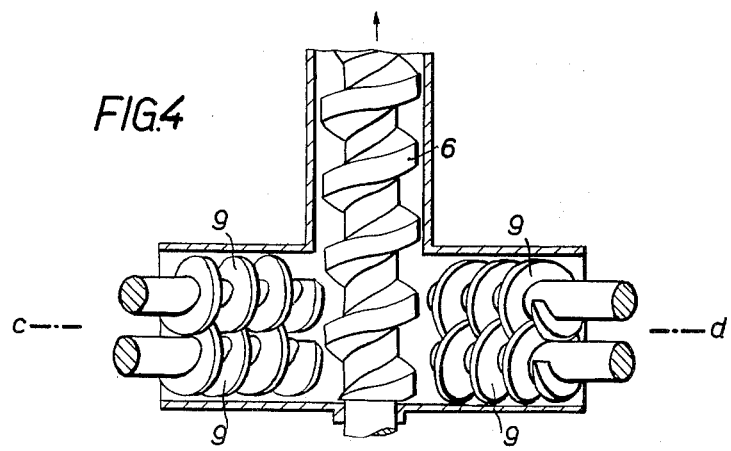
Figure 5:
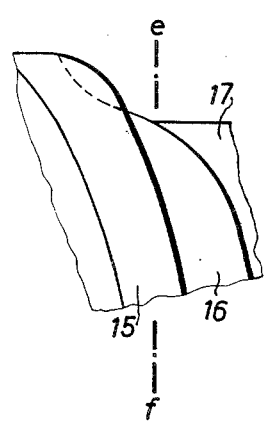
Figure 6:
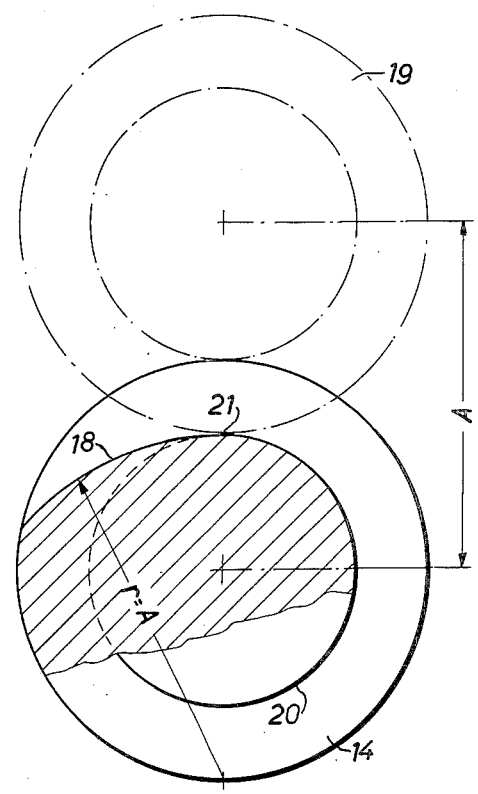

By way of example, two preferred embodiments of the invention will now be described with reference to the accompanying diagrammatic drawings in which Fig. 1 is a sectional view of a worm feeder for pulverized and granular goods of wet, sticky condition, Fig. 2 is a diagrammatic view in longitudinal section of the aforesaid worm feeder, Fig. 3 is a sectional view of a worm feeder for pasty goods, Fig. 4 is a top view of a worm feeder for pasty goods, the charging hopper being not illustrated, Fig. 5 shows a part of a feedscrew, and Fig. 6 is a sectional view through the feedscrew taken along the line e—f. The feedscrew working in opposite direction is marked in little lines and dots.

In Figs. 1 and 2 the worm feeder which is surrounded by casing 1—the feedscrews 2 and 3 of said worm feeder revolve in the same direction—takes the goods out of the charging hopper 4.

The charging hopper 4 is fixed to the casing by means of membrane 5 and is caused to vibrate by shaking apparatus 11, the charging hopper being vibrated in such a manner that the oscillations are preferably effective also in the immediate vicinity of the feedscrews. The wet material is thus loosened and the feedscrews arranged below the discharge orifice of the charging hopper are continually charged with sufficient quantities of material. Thus, the material is taken along by the double feedscrew in quantities corresponding to the number of revolutions of the double feedscrew and the material is conveyed in uniform quantities and discharged through discharge tube 13 since the rotating feedscrews scrape off their surfaces or edges as well as the wall of the casing.

Figs. 3 and 4 show the worm feeder consisting of the two feedscrews 6 and 7 rotating in like direction for conveying the plastic material from charging hopper 8.

Between charging hopper 8 and the feedscrews 6 and 7 conveyer worms 9 are arranged in V-shape which advance the plastic material to the feedscrews 6 and 7. The conveyer worms 9 may also be arranged in such a manner that they are mutually completely scraped off. The charging hopper 8 is fixed to the worm casing by means of a bellows-like membrane 10 and can be vibrated by the shaking apparatus 12 as described in the foregoing.

Fig. 5 shows a part of feedscrew 14 (of Fig. 6) with the surface of the helical thread 15, the surface of the flanks 16 and shaft 17. Fig. 6 is a sectional view of feedscrew 14 taken along the line e—f of Fig. 5. The surface of the flank 16 is so formed that when anywhere cut vertically to the worm shaft, forms circumferences. In Fig. 6 circumference 18 is shown which is formed of the cross-section along the line e—f of Fig. 5. The radius r of circumference 18 corresponds to the distance of the axis A of the feedscrews 14 and 19 gripping into each other. Feedscrew 19 which is marked in Fig. 6 in little lines and dots corresponds to the feedscrew shown in Fig. 14. The circumference 18 touches the shaft 20 of the feedscrew 14 at point 21.

We claim:

1. A worm feeder for dosing adhesive material difficult to convey, said worm feeder consisting of a casing provided at one end with a charging hopper for the material and at the other end with a discharge tube, feedscrews gripping one into the other being rotatably supported in said casing, said feedscrews closely fitting the casing, the surfaces of the flangs of the helical threads of said feedscrews forming when cut anywhere vertically to the worm shaft circumferences, the radii of said circumferences corresponding to the distance of the axes of two feedscrews gripping into one another, said circumferences touching the shaft of the feedscrews, said charging hopper being equipped with a shaking apparatus, and conveyer worms being arranged at the outlet junction of the charging hopper.

2. A worm feeder for dosing adhesive material difficult to convey, said worm feeder consisting of a casing provided at one end with a charging hopper for the material and at the other end with a discharge tube, feedscrews gripping one into the other being rotatably supported in said casing, said feedscrews closely fitting the casing, the surfaces of the flanks of the helical threads of said feedscrews forming when cut anywhere vertically to the worm shaft circumferences, the radii of said circumferences corresponding to the distance of the axes of two feedscrews gripping into one another, said circumferences touching the shaft of the feedscrews, and conveyer worms being arranged at the outlet junction of the charging hopper.

3. A worm feeder as defined in claim 2 wherein said conveyer worms are positioned in a V-shaped arrangement below the outlet of said hopper.

4. A worm feeder for adhesive material which is difficult to convey, comprising a charging hopper having a bottom discharge aperture, means to vibrate said hopper, a V-shaped receiving casing having side walls and a bottom apex positioned below said discharge aperture with its top in open communication with said aperture, feedscrews gripping one another rotatably supported along both sides of said receiving casing, said feedscrews closely fitting the walls of said receiving casing, a central casing in communication with the apex of said V-shaped receiving casing, feedscrews gripping one another rotatably supported so as to project through the apex of said V-shaped casing and said central casing, said feedscrews fitting closely within said central casing, and a discharge tube at the end of said central casing removed from receiving casing.

RUDOLF ERDMENGER.
PETER GASSEN.

References Cited in the file of this patent

UNITED STATES PATENTS

| Number | Name | Date |
| --- | --- | --- |
| 1,069,404 | Fiddyment | Aug. 5, 1913 |
| 1,419,946 | Schaffer | June 20, 1922 |
| 1,468,379 | Easton | Sept. 18, 1923 |
| 2,556,392 | Hawk | June 12, 1951 |
| 2,567,219 | Lesniak | Sept. 11, 1951 |

FOREIGN PATENTS

| Number | Country | Date |
| --- | --- | --- |
| 170,104 | Germany | Apr. 28, 1906 |